United States Patent [19]
Johnson et al.

[11] Patent Number: 6,088,198
[45] Date of Patent: *Jul. 11, 2000

[54] MAGNETIC HEAD HAVING A CORE PORTION OF POLYCRYSTALLINE MNZN FERROFERRITE

[75] Inventors: Mark T. Johnson; Freddy Roozeboom; Martinus H. W. M. Van Delden, all of Eindhoven, Netherlands

[73] Assignee: U.S. Philips Corporation, New York, N.Y.

[*] Notice: Under 35 U.S.C. 154(b), the term of this patent shall be extended for 1024 days.

[21] Appl. No.: 08/491,511

[22] Filed: Jun. 16, 1995

Related U.S. Application Data

[63] Continuation of application No. 07/969,897, Nov. 2, 1992, abandoned.

[30] Foreign Application Priority Data

Nov. 4, 1991 [EP] European Pat. Off. ............ 91202856

[51] Int. Cl.[7] ................................................. G11B 5/127
[52] U.S. Cl. ............................................................ 360/125
[58] Field of Search .................................... 360/125, 127

[56] References Cited

U.S. PATENT DOCUMENTS

| | | | |
|---|---|---|---|
| 4,285,894 | 8/1981 | Watanabe et al. ........................ 264/61 |
| 4,521,323 | 6/1985 | Hirota et al. ............................. 360/127 |
| 4,568,993 | 2/1986 | Stoppers et al. ......................... 360/125 |
| 4,734,802 | 3/1988 | Higuchi et al. .......................... 360/122 |
| 4,796,127 | 1/1989 | Wada et al. .............................. 360/103 |
| 4,841,400 | 6/1989 | Matsuzawa ............................... 360/125 |
| 5,049,454 | 9/1991 | Johnson et al. .......................... 360/125 |

FOREIGN PATENT DOCUMENTS

| | | |
|---|---|---|
| 56-22207 | 3/1981 | Japan . |
| 4158503 | 6/1992 | Japan . |

OTHER PUBLICATIONS

Mee, C. Denis & Daniel, Eric D.; Magnetic Recording Handbook; 1990; p. 294.

Primary Examiner—David Davis
Attorney, Agent, or Firm—John C. Fox

[57] ABSTRACT

Magnetic heads comprising at least one core portion of polycrystalline MnZn-ferroferrite material exhibit a very low so-called "rubbing noise" level if the average grain size of the material ranges between 0.2 and 3.0 micrometers. The rubbing noise level of these heads is even lower than the electronic noise level if the average grain size of the material ranges between 0.5 and 2.0 micrometers. By virtue thereof, the heads can very suitably be used in the frequency range from 5 to 100 MHz.

11 Claims, 3 Drawing Sheets

MAGNETIC HEAD HAVING A CORE PORTION OF POLYCRYSTALLINE MNZN FERROFERRITE

This is a continuation of application Ser. No. 07/969,897, filed Nov. 2, 1992 now abandoned.

The invention relates to a magnetic head comprising one or more than one core portions of polycrystalline MnZn-ferroferrite material. Such magnetic heads are used for recording, erasing and/or reading information on a magnetic carrier such as, for example, a magnetic disc or a magnetic tape. Consequently, they are frequently used in audio and video equipment.

BACKGROUND OF THE INVENTION

Such a magnetic head is known from United States Patent Document U.S. Pat. No. 4,521,323. This publication describes, more particularly, a magnetic head comprising a core portion of sintered MnZn ferroferrite, which core portion contains, besides Mn, Zn and Fe, considerable quantities of metals such as Na, Zr and/or Ca. By adding Na, the average grain size of the polycrystalline ferroferrite can be defined within the range from 5 to 20 micrometers.

Applicants have found that during operation of the known magnetic head a relatively high level of so-called "rubbing-noise" occurs. This noise is caused by mechanical vibrations in the core portions of the head. Such vibrations occur when a magnetic carrier is caused to move "in-contact" past the contact face of the magnetic head. Such mechanical vibrations are coupled via the magnetostriction to the magnetization of the magnetic ferrite material. The resultant flux variations in the core windings bring about a noise on the output signal, i.e. the above-mentioned "rubbing noise". This causes wide noise peaks, in particular, in the frequency range from 5 to 40 MHz.

Another type of noise which plays an important part in the operation of magnetic heads is termed "electronic noise". This is to be understood to mean the noise which is caused by the electronic components of the equipment in which the magnetic head is used. The level of this noise is governed predominantly by the preamplifier(s) of the read circuit of the equipment. It has been found that in the known magnetic head the "rubbing noise" considerably exceeds the "electronic noise". The occurrence of a relatively high level of rubbing noise is perceived as a disadvantage.

SUMMARY OF THE INVENTION

It is an object of the invention to provide a magnetic head having a rubbing noise level which is substantially below that of the known magnetic head. The invention more particularly aims at providing a magnetic head having a rubbing noise level which is comparable to or lower than the electronic noise level of the customary equipment. The intended reduction of the rubbing noise level must be attained, in particular, in the frequency range from 5–100 MHz. In addition, the ferrite material of the magnetic head should have a magnetic permeability of at least 200.

These objects are achieved by a magnetic head comprising one or more than one core portions of polycrystalline MnZn-ferroferrite material, which magnetic head is characterized according to the invention in that the average grain size of the ferrite material ranges between 0.2 and 3.0 micrometers.

Applicants have found that magnetic heads comprising polycrystalline core portions whose grain size is selected in accordance with the invention exhibit a surprisingly low level of rubbing noise. Further it has been found that the ferrite material of these magnetic heads exhibits the required magnetic permeability. At an average grain size of less than 0.2 micrometer, magnetic heads are obtained having a permeability which is too low, i.e. below 200. Consequently, the magnetic efficiency of these heads is insufficient. At an average grain size in excess of 3.0 micrometers, the magnetic head exhibits a rubbing noise level which considerably exceeds the electronic noise level, in particular, in the frequency range from 5 to 40 MHz. An optimum result is obtained by using magnetic heads having a polycrystalline core portion and an average grain size in the range between 0.5 and 2.0 micrometers. In comparison with the electronic noise, the magnetic heads exhibit a negligibly low level of rubbing noise. In addition, the ferrite material of these magnetic heads exhibits a relatively high magnetic permeability. This results in a relatively high efficiency of the heads.

An interesting embodiment of the magnetic head according to the invention is characterized in that the density of the material is at least 98% of the maximum theoretical density. The maximum density of pure (i.e.: unsubstituted) MnZn-ferroferrite material is 5.15 g per $cm^3$. By means of this measure it is achieved that the number of pores in the polycrystalline material is small. By virtue thereof, the length of the magnetic gap right across the width of the gap is very uniform. This results in an improved "output" of the magnetic signal.

A further advantageous embodiment of the magnetic head is characterized according to the invention in that the composition of the material corresponds to the formula:

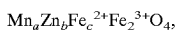
$Mn_aZn_bFe_c^{2+}Fe_2^{3+}O_4$, where 0.25<a<0.48

0.50<b<0.60

0.02<c<0.15 a+b+c=1

The absolute value of the individual magnetostriction constants $1_{111}$ and $1_{100}$ of MnZn ferroferrite of this composition is relatively small. As the rubbing noise level is proportional to the value of the magnetostriction constants, the magnetic heads of this composition exhibit a relatively low level of rubbing noise. This relatively low rubbing noise level is reduced even further by selecting the average grain size of the sintered material in the range from 0.2–3.0 and, in particular, in the range from 0.5–2.0 micrometers.

Another embodiment of the magnetic head according to the invention is characterized in that the composition of the material corresponds to the formula

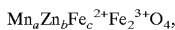
$Mn_aZn_bFe_c^{2+}Fe_2^{3+}O_4$, where $0.00<a \leq 0.55$ $0.06<b \leq 0.40$ $0.25<c \leq 0.90$ a+b+c=1

This type of magnetic heads according to the invention exhibits a low rubbing noise level and, in addition, a relatively high saturation magnetization of 0.6 T and higher. Such magnetic heads can be very successfully applied in magnetic carriers having a relatively high coercive force.

A further magnetic head which, according to the invention, can be used very advantageously is characterized in that the composition of the material corresponds to the formula $$Mn_aZn_bFe_c^{2+}Fe_2^{3+}O_4,$$

where 0.30<a<0.78

0.20<b<0.50

0.02<c<0.25 a+b+c=1 Magnetic heads of this composition do not only have a low rubbing noise level but also a sufficiently high saturation magnetization of 0.5 T and a relatively high permeability.

A further interesting embodiment of the magnetic head according to the invention is characterized in that the MZn-ferroferrite material of the one or more than one core portions of the magnetic head is monocrystalline in the vicinity of the gap area. When this type of magnetic head is in operation, the magnetic carrier moves past the monocrystalline part of the part of the core portions adjoining the gap. This monocrystalline part is more resistant to wear than the polycrystalline part. Consequently, this measure results in substantially improved wear properties of the magnetic head in general and the area of the magnetic gap in particular.

The sintered polycrystalline MnZn-ferroferrite material is manufactured by wet-chemical methods, in particular by coprecipitation. These methods enable ferrite material having an average grain size in the range between 0.2 and 3.0 micrometers to be manufactured. The average grain size of the material is governed by the sintering temperature used. The average grain size of the ferrite material is determined by the so-called "mean intercept method".

BRIEF DESCRIPTION OF THE DRAWINGS

The invention will be explained in greater detail by means of exemplary embodiments and with reference to the accompanying drawing, in which FIG. 3-1, 3-2, 3-3, 3-4, 3-5, 3-6 shows noise spectra of a number of magnetic heads having different grain sizes of the MnZn-ferroferrite material used therein.

DESCRIPTION OF THE INVENTION

Figure 1:
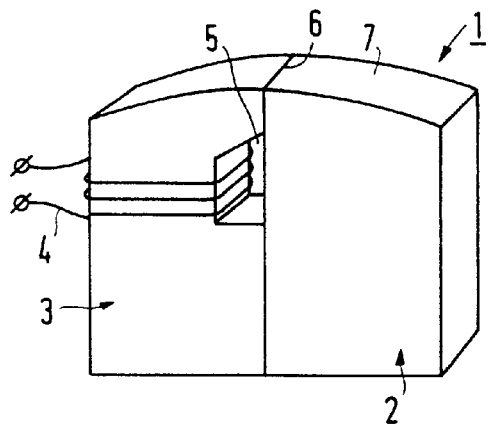
FIG. 1 is a magnetic head comprising a core portion of polycrystalline ferroferrite material according to the invention.

FIG. 1 shows a magnetic head 1 comprising two core portions 2 and 3 of polycrystalline MnZn ferrite. A coil wire 4 which extends through winding aperture is wound around core portion 3. Coil wire 4 serves to transmit read, record and/or 30 erase signals. The core portions 2 and 3 are bonded together in the gap by means of glass. The interconnection can also be realised by means of thermocompression of Mo-Au-Mo layers. Reference numerals 6 and 7 indicate the magnetic gap and the contact face of the magnetic head, respectively.

Figure 2A:
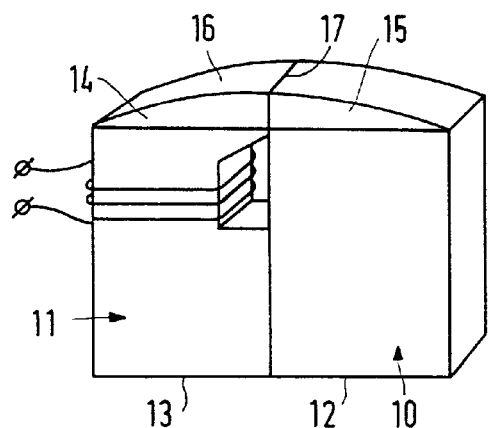
FIG. 2A and 2B shows other magnetic head construction according to the invention.
Figure 2B:
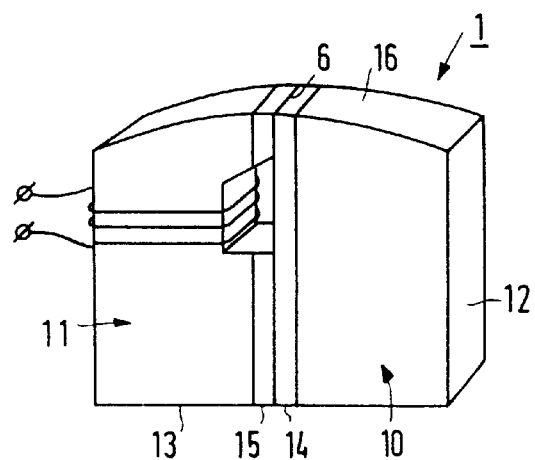
Figures 1A, 1B, 3:
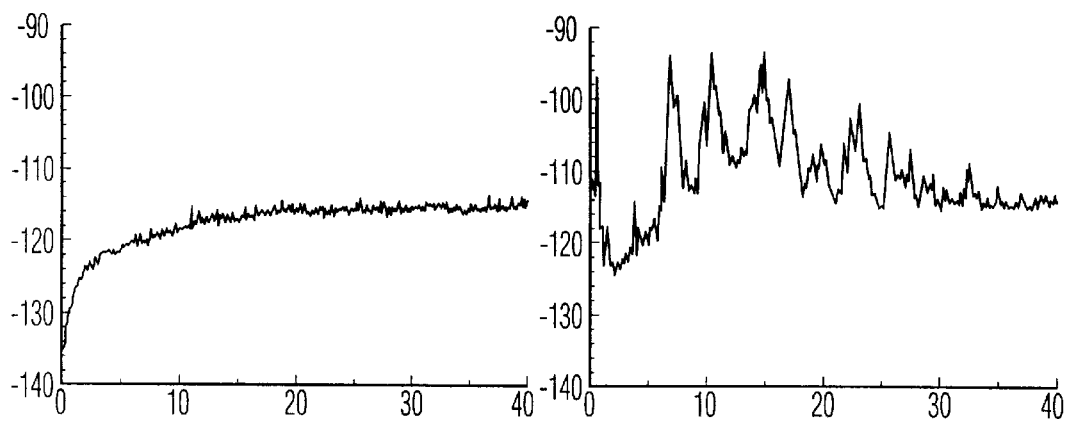
Figures 2A, 2B, 3:
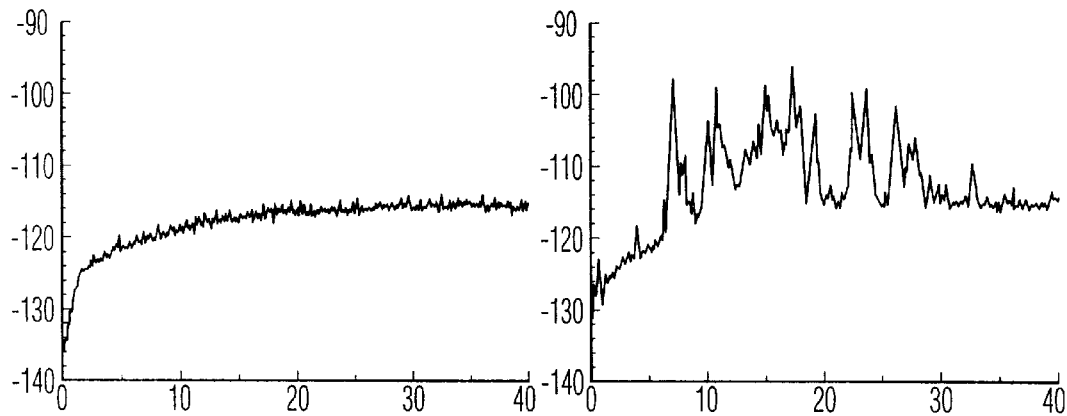
Figures 3, 3A, 3B:
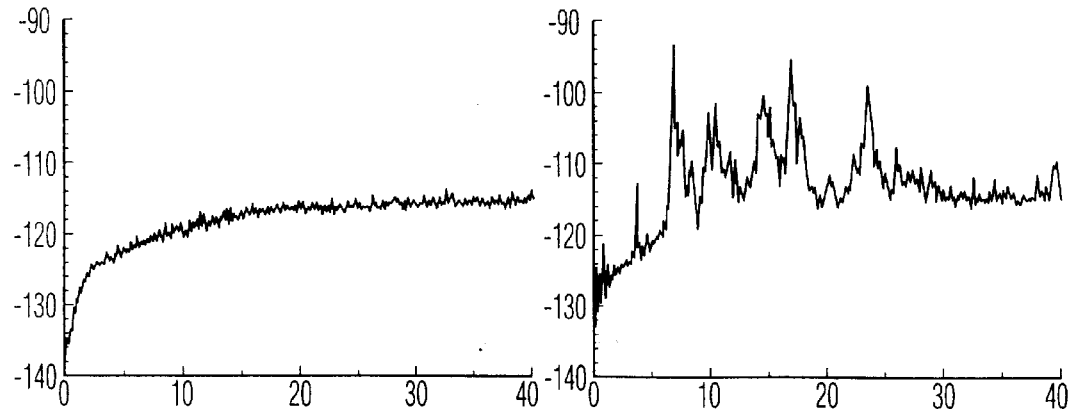
Figures 3, 4, 4A, 4B:
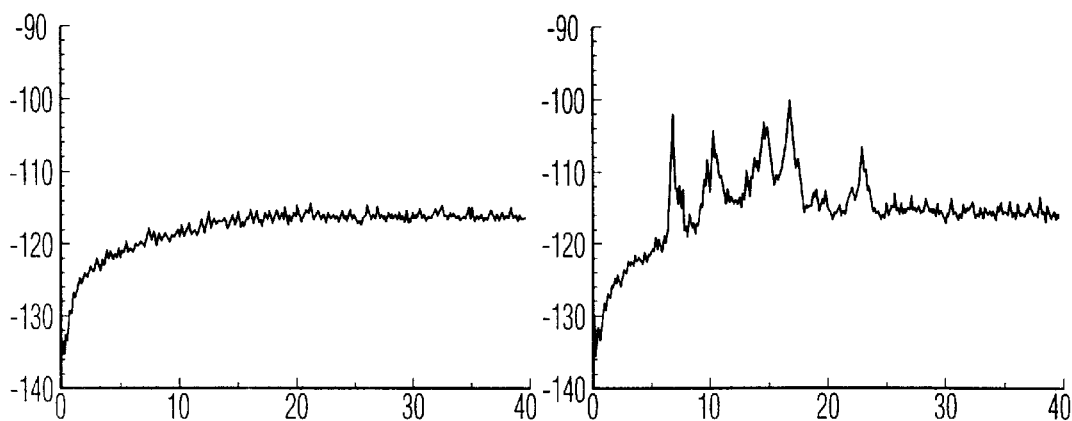
Figures 3, 4, 5, 5A, 5B:
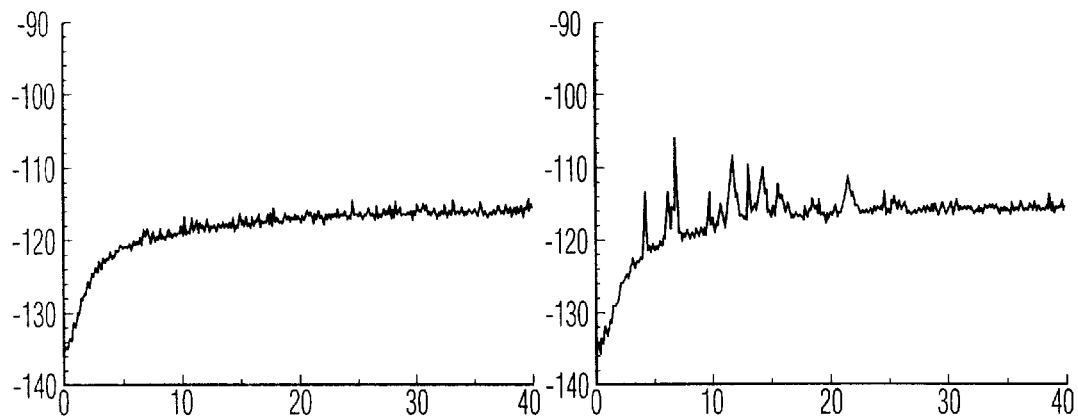
Figures 3, 4, 5, 6, 6A, 6B:
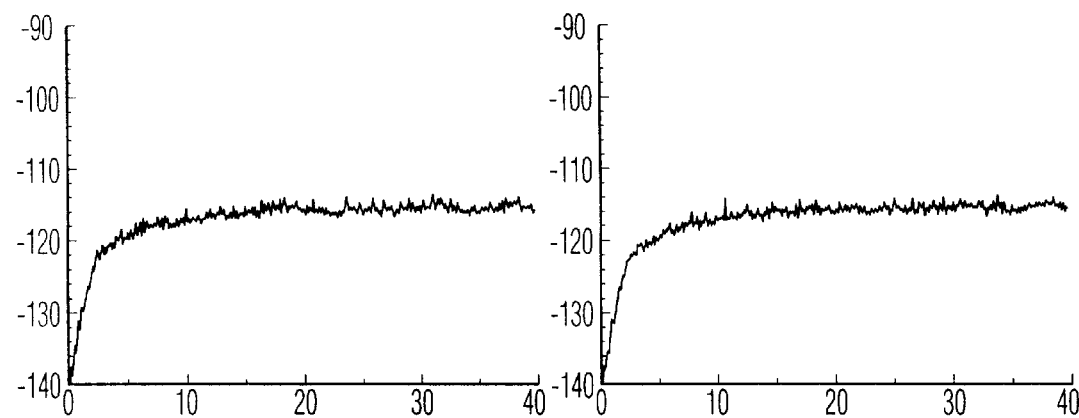

FIG. 2 shows other magnetic heads. The head of FIG. 2A has two core portions 10 and 11. Both core portions consist partly of polycrystalline MnZn-ferrite material 12 and 13 and partly of monocrystalline material 14 and 15. The polycrystalline parts grow into the monocrystauifle parts in such a manner that they are attached thereto. The contact face 16 of this magnetic head is formed by the monocrystalline parts. This type of magnetic head has a better resistance to wear than the head described in the preceding paragraph. Both core portions are bonded together by means of glass. The gap area of the head comprises a monocrystalline portion and a polycrystalline portion.

A variant of this so-called "mono-polyhead" is shown in FIG. 2B. In this Figure the same reference numerals as in FIG. 2A are used. In this magnetic head, the gap area is completely bounded by the monocrystalline portions 14 and 15. In this variant, the contact face 16 is formed by both polycrystalline and monocrystalline ferroferrite material. In both variants the edge formed by the gap area and the contact face consists of the wear-resistant monocrystalline material. To obtain a good signal, this edge must have a well-defined shape and well-defined dimensions and, hence, be insensitive to wear.

It is noted that the use of the MnZn-ferroferrite material according to the invention is not limited to the above-described type of magnetic head. The material can also successfully be used in "metal in gap" (MIG) heads, in "sandwich" heads or as a substrate for thin-film heads.

The polycrystalline core portions are manufactured by wet-chemical methods. In such methods, the ferrite material is manufactured by direct oxidation of mixed $Me^{2+}$-$Fe^{2+}$-hydroxides (Me=Zn, Mn,etc.) in an aqueous solution at a temperature of 70–90° C. After the fine ferrite powder formed has deposited it is washed a number of times. The powders are then brought into the desired shape by means of sedimentation filtration of an alkaline suspension of the powders. After drying, the pressed powders are sintered at a maximum temperature in the range from 750° C. to 1250° C., in which process the oxygen content is varied in such a manner that an equilibrium oxygen pressure exists between the sintered material and the sinter atmosphere. The average grain size of the sintered ferrite material can be varied as a function of the maximum temperature and the duration of the sintering process.

FIG. 3 shows a number of spectra in which noise (dB) as a function of the frequency (MHz) is measured on the magnetic heads of FIG. 1. The core portions consisted of polycrystalline MnZn-ferroferrite material having a composition which corresponds to the formula $Mn_{0.62}Zn_{0.32}Fe_{0.06}Fe_2O_4$. The average grain size was 9.3 micrometers (FIG. 3-1), 8.2 micrometers (FIG. 3-2), 7.6 micrometers (FIG. 3-3), 5.0 micrometers (FIG. 3-4), 2.9 micrometers (FIG. 3-5) and 1.6 micrometers (FIG. 3-6).

The spectra of FIG. 3 which are indicated by the letter B were recorded while a magnetic carrier was caused to move past the contact face of the magnetic head having the relevant average grain size. In these experiments the tape velocity was 40 m/s. A S-VHS-tape was used as the magnetic carrier. The B spectra show a summation of the electronic noise and the rubbing noise. The corresponding A spectra were recorded without the carrier contacting the contact face of the relevant magnetic head. Consequently, these spectra only represent the electronic noise.

The spectra clearly show that the rubbing noise decreases substantially when magnetic heads of MnZn-ferrite material having an average grain size of less than 3 micrometers are used. When the average grain size is less than 2 micrometers, noise spectra recorded with tape contact hardly differ from noise spectra recorded without tape contact. In this case, the rubbing noise level is lower than the electronic noise level. For clarity, only the range from 0–40 MHz is shown. In the range from 40 to 100 MHz and using the above-mentioned different grain sizes, no appreciable difference between the A and the B spectra was observed.

What is claimed is:

1. A magnetic head comprising at least one core portion of polycrystalline MnZn ferroferrite material, said material having an average grain size ranging between 0.2 and 3.0 micrometers in order to substantially reduce output noise signals.

2. A magnetic head as claimed in claim 1, wherein the average grain size of the material ranges between 0.5 and 2.0 micrometers.

3. A magnetic head as claimed in claim 2, wherein the density of the material is at least 98% of the maximum theoretical density.

4. A magnetic head as claimed in claim 3, wherein the composition of the material corresponds to the formula:

$$Mn_aZn_bFe_c^{2+}Fe_2^{3+}O_4,$$

where 0.25<a<0.48

0.50<b<0.60

0.02<c<0.15 a+b+c=1.

5. A magnetic head as claimed in claim 4, wherein the MnZn ferroferrite of the core portions of the magnetic head is monocrystalline in the vicinity of the gap area.

6. A magnetic head as claimed in claim 3, wherein the composition of the material corresponds to the formula $$Mn_aZn_bFe_c^{2+}Fe_2^{3+}O_4,$$

where 0.00<a≦0.55

0.06≦b≦0.40

0.25≦c≦0.90 a+b+c=1.

7. A magnetic head as claimed in claim 6, wherein the MnZn ferroferrite of the core portions of the magnetic head is monocrystalline in the vicinity of the gap area.

8. A magnetic head as claimed in claim 3, wherein the composition of the material corresponds to the formula $$Mn_aZn_bFe_c^{2+}Fe_2^{3+}O_4,$$

where 0.30<a<0.78, 0.20<b<0.50, 0.02<c<0.25, a+b+c=1.

9. A magnetic head as claimed in claim 8, wherein the MnZn ferroferrite of the core portions of the magnetic head is monocrystalline in the vicinity of the gap area.

10. A magnetic head as claimed in claim 3, wherein the MnZn ferroferrite of the core portions of the magnetic head is monocrystalline in the vicinity of the gap area.

11. A magnetic head comprising at least one core portion of polycrystalline MnZn ferroferrite material, said material having an average grain size ranging between 0.2 and 3.0 micrometers so that the rubbing noise level is less than the electronic noise level.

* * * * *